United States Patent [19]

Trieschock et al.

[11] 4,192,843

[45] Mar. 11, 1980

[54] METHOD FOR BLOW MOLDING OF THERMOPLASTIC ARTICLES

[75] Inventors: George E. Trieschock, Plainfield; George H. Dunbeker, Hightstown, both of N.J.

[73] Assignee: Rheem Manufacturing Company, New York, N.Y.

[21] Appl. No.: 859,854

[22] Filed: Dec. 12, 1977

[51] Int. Cl.² ............................................. B29C 17/07
[52] U.S. Cl. .................................... 264/528; 264/523; 264/540; 425/526
[58] Field of Search ....................... 264/89, 94, 96–99, 264/237, 348, 523, 528, 529, 530, 535, 537–543; 425/526

[56] References Cited

U.S. PATENT DOCUMENTS

| 3,127,458 | 3/1964 | Scott, Jr. et al. ................ 425/526 X |
| 3,534,555 | 10/1970 | Webb ..................................... 60/217 |
| 3,851,028 | 11/1974 | Beyer ............................... 264/237 X |
| 3,937,610 | 2/1976 | Farrell ................................... 425/526 |

*Primary Examiner*—Jan H. Silbaugh
*Attorney, Agent, or Firm*—Watson, Leavenworth, Kelton & Taggart

[57] ABSTRACT

A mixture of water and surfactant is introduced interiorly of a parison in the course of blow molding thereof. Lessening of die closure time and improved conformity of dimensions of molded articles to corresponding dimensions of forming dies are achieved.

2 Claims, 3 Drawing Figures

METHOD FOR BLOW MOLDING OF THERMOPLASTIC ARTICLES

FIELD OF THE INVENTION

This invention relates to the making of plastic articles and, more particularly, to improvements in the blow molding of containers.

BACKGROUND OF THE INVENTION

In long-standing practice, as shown for example in commonly-assigned U.S. Pat. No. 3,733,384, plastic containers are formed by introducing a molten plastic tube (parison) between spaced dies and closing the dies upon the parison. The dies define a cavity which imparts desired exterior shape to the parison, inclusive of a cavity part providing a container filling/emptying opening. A blow pin is supported in the paths of movement of the parison to be sealably encircled by the parison on closure of the dies. As the dies close, the blow pin conducts pressurized air into the parison, forcing it to conform to the shape of the die cavity.

A measure of dimensional stability of the thus-formed container need of course to be attained prior to withdrawing the container from the dies, i.e., the plastic substance need be cooled to effect a transition from its flowable parison state to a substantially less flowable condition. For this purpose, coolant is continually circulated through the dies to extract heat from the plastic material.

The time of closure of the dies is the dominant factor in the commercially-significant cycle time for making a plastic blow-molded container. Thus, the longer the die closure time prior to reaching sufficient container dimensional stability to permit die opening, the lesser the number of containers produced per unit time. With respect to dimensional stability, post-forming shrinkage occurs in increasing measure with increased temperature of the plastic material on die-opening. Lessening of die closure time and of container temperature on die-opening have accordingly been primary objectives of commercial container producers.

In seeking after these objectives, artisans have looked toward cooling interiorly of the formed parison as a supplement to the above-noted die cooling practice. One prior art effort attaining the objectives, however, at substantial cost increase, involves the introduction of liquid carbon dioxide through the blow pin. On its presence in the high temperature parison, the carbon dioxide undergoes state change to a solid, and then sublimes, thereby affecting substantial cooling of the parison.

Another prior art effort provides for the use of water as a direct coolant for the parison. The water is sprayed onto the parison interior surface through a spray head supported within the blow pin. This technique, known as the ISC system, applies water droplets onto the parison interior surface and such droplets have been observed to be non-uniformly distributed and to mar the interior walls of the formed container. There also is an undesired water remnant in the container.

U.S. Pat. No. 3,694,424 describes an improved ISC practice said to be effective to uniformly cost the parison interior. A chilled highly-pressurized mixture of air and water is injected into the parison in the course of its customary air pressurization. The mixture is pressurized at a level some ten times more than such customary level. The patent hypothesizes that the chilled mixture is subjected to such sudden pressure drop that there is an instantaneous adiabatic expansion of the mixture applying water in its three phases to all interior surface of the parison. Increased costs in this practice attend the chilling and high pressurization of the air-water mixture.

SUMMARY OF THE INVENTION

It is an object of the present invention to provide improved methods for use in blow molding plastic container.

It is a more particular object of the invention to provide enhanced and simplified interior cooling of blown parisons.

In attaining the foregoing and other objects, the invention provides for the introduction, interiorly of a blown parison within a mold cavity, of a mixture of water and a surface active material (surfactant). As reported in detail hereinafter, such practice results in a reduction of the above-discussed die closure time and improved conformity of blow molded articles to dimensions intended by die configuration.

While surfactants are available in numerous commercial forms and have been employed in various endeavors, applicant's usage thereof to expedite the manufacture of a hollow thermoplastic article is considered remote from and not suggested by any such previously known usage. The most widespread usage of surfactants is in detergents or wetting agents wherein surfactants dissolve in liquid imparting thereto enhanced cleansing and penetrating properties. In this usage, the primary property required is that the surfactant be surface-active, i.e., concentrate at surfaces and interfaces. This property is realized by surfactant molecular structure in one part water-soluble and in other part lipid-soluble. A compromise is reached whereby the surfactant parts are matched, respectively to the solvent and the surface to be wetted, to accommodate both sufficient dissolving of the surfactant and a preselected measure of surface adsorption of the surfactant. By modifying molecular composition, the functions of surfactants can be reversed from such wetting action to form a surface film rather than be surface-adsorbed. The latter surfactants find use as foaming or emulsifying agents useful in fire extinguishing. Other reported uses of surfactants are in germicides, fungicides or insecticides, corrosion prevention, ore flotation, fabric dying, carriers for perfume, in promoting flow of oil in porous rocks and in retarding evaporation. U.S. Pat. No. 3,534,555 shows a still further use, namely, introduction of surfactant in trace amount (10 to 100 parts per million) in rocket fuel or coolant to provide wall surface films to reduce fuel-wall friction and enable a greater amount of cooling fluid flow.

The foregoing and other objects and features of the invention will be evident from the following detailed description of the preferred embodiments thereof and from the drawings wherein like reference numerals identify like parts throughout.

DESCRIPTION OF THE PREFERRED EMBODIMENT

Figure 1:
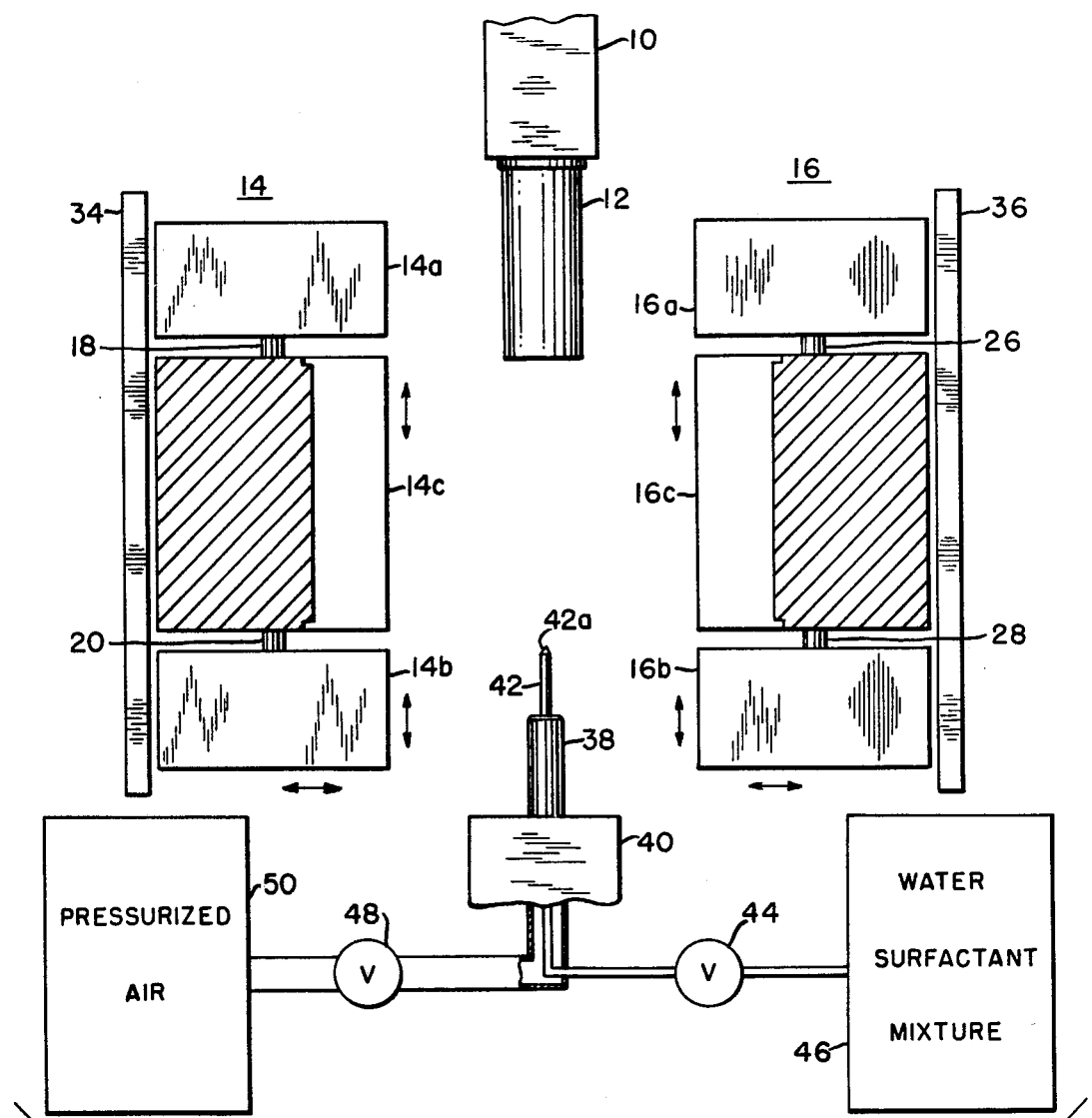
FIG. 1 is a front elevational view, partly in section, of apparatus for the manufacture of containers in accordance with the invention.
Figure 2:
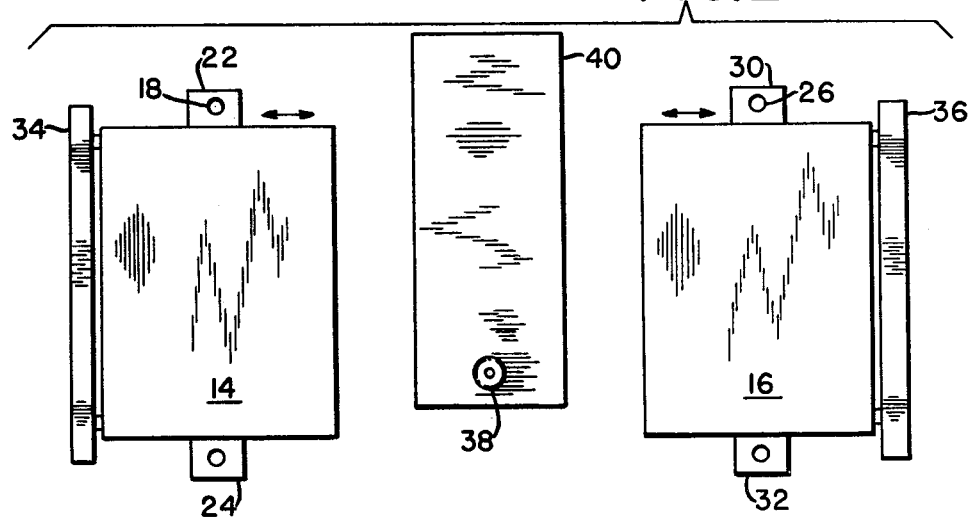
FIG. 2 is a plan view of the FIG. 1 apparatus.

Referring to FIGS. 1 and 2, extruder 10 issues extruded tube or parison 12 of plastic into the spacing between opposed molding die members 14 and 16. Molding member 14 includes stationary upper section 14a and lower and central sections 14b and 14c which are vertically movable by shafts 18 and 20, as operated by hydraulic cylinder actuators 22 and 24. In such vertical movement, central section 14c engages stationary section 14a and lower section 14b engages central section 14c. Molding member 16 has counterpart sections 16a, 16b and 16c, shafts 26 and 28 and actuators 30 and 32. Members 14 and 16 are translatable horizontally on application of ram pressure to backing plates 34 and 36 by operating elements not shown, whereby members 14 and 16 may define a mold cavity in communication with blow pin 38. The blow pin is supported by base 40.

Extending centrally through blow pin 38 and upwardly thereof is a pipe 42 having an issue nozzle 42a and sealably connected outwardly through pin 38 and through valve 44 to a container 46 which contains a pressurized mixture of water and surfactant. Blow pin 38 is connected through valve 48 to a source 50 of pressurized air.

Figure 3:
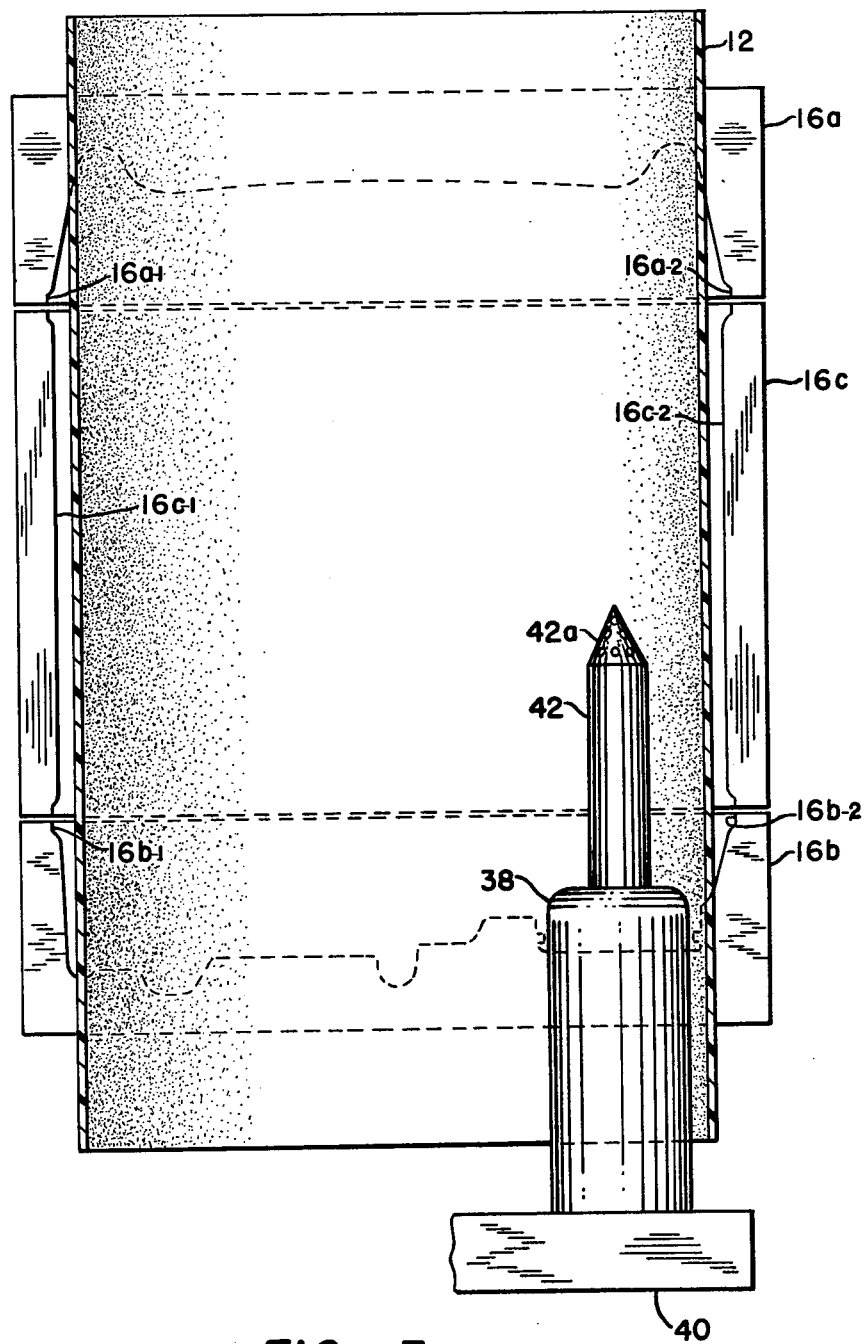
FIG. 3 illustrates the positional relationships of a parison and parts of the apparatus of FIGS. 1 and 2 in practicing the invention.

Referring to FIG. 3, mold sections 16a–16c have interior surfaces which are cooperative to define a mold cavity for the manufacture of a plastic container having exterior configuration described in copending commonly-assigned applications Ser. Nos. 725,004 (now U.S. Pat. No. 4,098,392) and 724,982 (now U.S. Pat. No. 4,033,473), both filed on Sept. 20, 1976. Such container has a neck part encircling a filling/emptying opening formed by engagement of molding member sections 14b and 16b and blow pin 38 respectively with exterior and interior surfaces of parison 12. The parison sealably encircles the blow pin on closure of the molding members and valve 48 is opened at this juncture blowing the parison against the walls of the mold cavity. Then, valve 44 is opened and then closed, applying an amount of the mixture of surfactant and water to the interior surface of the distended parison. Upon expiration of a preselected die closure time period, discussed by examples below, valve 48 is closed and molding members 14 and 16 are separated. The formed container is pulled from blow pin 38.

An appreciation of benefits obtained by practice according with the invention will be had by considering the results thereof contrasted with results obtained in the above-noted ISC practice as shown in comparative examples set forth below for making containers of type disclosed in the last-noted patent and application.

EXAMPLE 1

A parison of polyethylene at extruder exit temperature of 380° F. is enclosed by molding members 14 and 16 and valve 48 is opened at time zero. Air is supplied from source 50 at a pressure of from 80 to 100 psig. Container 46 is substituted with a source of water under pressure of 30 psig connected to valve 44. Valve 44 is opened at time 4 seconds for a time period of 28 seconds and is then closed. Valve 48 is closed and, at time 51 seconds, the molding members are separated. Upon settling of the container out of the die cavity to base temperature of 73° F., diametric spacings between container surfaces corresponding to FIG. 3 molding member surfaces 16a–1 and 16a–2 (container bottom swage), 16b–1 and 16b–2 (container top swage) and 16c–1 and 16c–2 (container center body) are 11.260, 11.203 and 11.354 inches. The diametric spacings between molding member surfaces 16a–1 and 16a–2, 16b–1 and 16b–2 and 16c–1 and 16c–2 are 11.750, 11.750 and 11.600 inches.

EXAMPLE 2

A parison of polyethylene at extruder exit temperature of 380° F. is enclosed by molding members 14 and 16 and valve 48 is opened at time zero. Air is supplied from source 50 at the same pressure as in Example 1. Container 46 is provided with a mixture of water and an aqueous surfactant commercially-available in a six per cent concentration from Minnesota Mining and Manufacturing (3M) as LIGHT WATER—Aqueous Film Forming Foam. The concentration of the mixture is one part aqueous surfactant to 256 parts water, i.e., the surfactant is 0.023 per cent by liquid volume of the mixture. With container 46 pressurized at 30 psig, valve 44 is opened at time 4 seconds for a time period of 28 seconds and is then closed. Valve 48 is closed and, at time 51 seconds, the molding members are separated. Upon settling of the container out of the die cavity to base temperature of 73° F., diametric spacings between container surfaces corresponding to FIG. 3 molding member surfaces 16a–1 and 16a–2, 16b–1 and 16b–2 and 16c–1 and 16c–2 are 11.320, 11.316 and 11.371 inches. The diametric spacings between molding member surfaces are as set forth in Example 1.

EXAMPLE 3

The practice of Example 2 is repeated except that valve 44 is opened at time 4 seconds for a time period of 24 seconds and is then closed and that the molding members are separated at time 47 seconds. Upon settling of the container out of the die cavity to base temperature of 73° F., diametric spacings between container surfaces corresponding to FIG. 3 molding member surfaces 16a–1 and 16a–2, 16b–1 and 16b–2 and 16c–1 and 16c–2 are 11.339, 11.330 and 11.400 inches. The diametric spacings between molding member surfaces are as set forth in Example 1.

In the foregoing preliminary discussion, mention is made of post-forming shrinkage of molded thermoplastic articles and lessening thereof with increased die closure time. Were the die closure time to extend such that the container reached the above-noted base temperature (73° F.), the dimensions of the container would closely accord with those of the die cavity and substantially no post-forming shrinkage would occur. As die closure time is decreased for commercial necessity, container dimensions depart accordingly from those of the die cavity. In Example 1 above, with no surfactant and a die closure time of 51 seconds, the container top swage dimension (11.203 in.) misses the corresponding mold cavity dimension (11.750 in.) by 0.547 inch. The bottom swage miss will be seen to be 0.490 inch and the center body miss 0.246 inch. Ideally, the center body should be recessed from, and thus protected by the swages, as intended by the mold cavity center body dimension, 11.600 inch as against the mold cavity swage dimension, 11.750 inch. The ideal is missed by 0.151 inch (11.354–11.203 in.).

In Example 2, a closer approach of the container swage and center body dimensions to the ideal is achieved, i.e., each dimension increases over the corresponding Example 1 container dimension. The recessing miss of center body versus swage is lessened to 0.055 inch, more closely approaching the ideal. These improvements in Example 2 practice are attained without increase of die closure time, i.e., all parameters are in common with Example 1, except for the introduction of the surfactant.

In Example 3, die closure time is reduced to 47 seconds, an eight per cent reduction over the 51 second die closure times common to Examples 1 and 2. As in the case of Example 2, the swage and center body dimensions better approach the corresponding mold cavity dimensions than the counterpart dimensions of the Example 1 container. While the recessing miss of the Example 3 container (11.400 minus 11.330 or 0.070 in.) is slightly larger than that of Example 2, it is greatly improved over that of Example 1 (0.151 in.), being less than half thereof.

As will now be seen, benefit attends practice under this invention both on attainment of closer realization of dimensional objectives and on lessening of die closure time. The improved dimensional achievement lessens wear on containers during upright shipping and rolling since lesser forces are imposed on the center body portion of the containers. The lessening of die closure time has evident merit in permitting increased production of containers per unit of time.

The surfactant usage percentage noted in Example 2 above is representative of practice under the invention. Evidently, minimum surfactant usage for cycle time reduction with desired dimensional conformity is promotive of optimized production efficiency. For polyethylene containers in the FIG. 3 configuration of 2.5 to 6 gallons capacity, it has been determined that the surfactant can be used in a range as low as 0.023 per cent to as much as 0.36 per cent. Use of surfactant in greater concentration is observed to be wasteful and to leave undesired residue in formed containers. The surfactant choice is optional. However, a non-crystallizing surfactant is preferred.

While the invention has been disclosed by way of particularly preferred embodiments, various changes and modifications thereof will be evident to those skilled in the arts, particularly the arts of making molded thermoplastic articles and containers. The particularly disclosed embodiments are thus intended in an illustrative and not in a limiting sense, the true spirit and scope of the invention being set forth in the following claims.

What is claimed is:

1. In a method comprising the step of introducing pressurized air interiorly of a parison of thermoplastic material at a sufficient pressure to transform the parison into a hollow article, the improvement comprising the steps of:

(a) providing a mixture of water and surface active matter, said mixture including said surface active matter in percentage of from 0.023 percent to 0.36 percent of the liquid volume of said mixture; and (b) introducing said mixture into the interior surface of said parison in the course of air pressurization of said parison.

2. The invention claimed in claim 1 wherein said surface active matter is non-crystallizing.

* * * * *